Sept. 15, 1942.    J. E. FLESCH    2,295,556
SPRING GROUP
Filed March 15, 1941    2 Sheets-Sheet 1
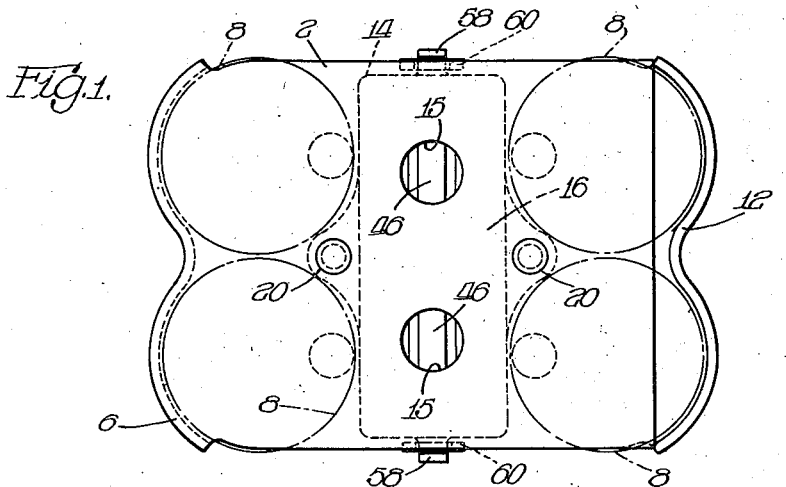
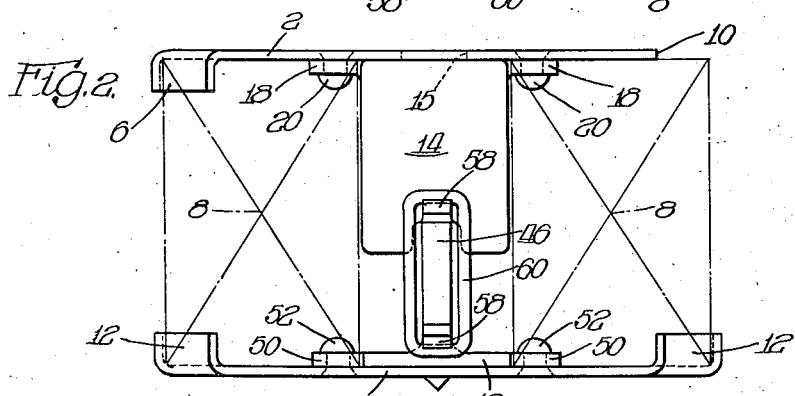
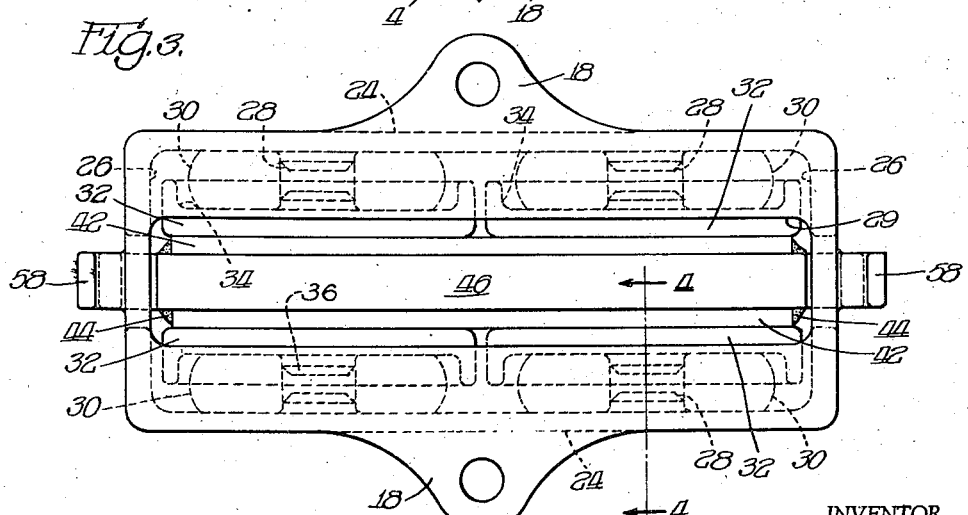
INVENTOR.
John E. Flesch
BY
Atty.

Sept. 15, 1942.   J. E. FLESCH   2,295,556
SPRING GROUP
Filed March 15, 1941   2 Sheets-Sheet 2
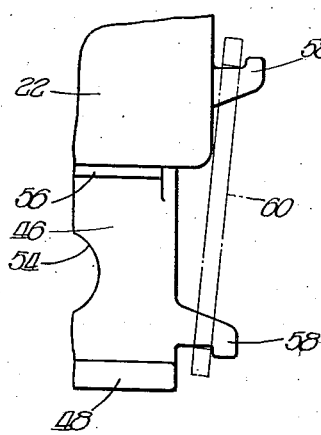
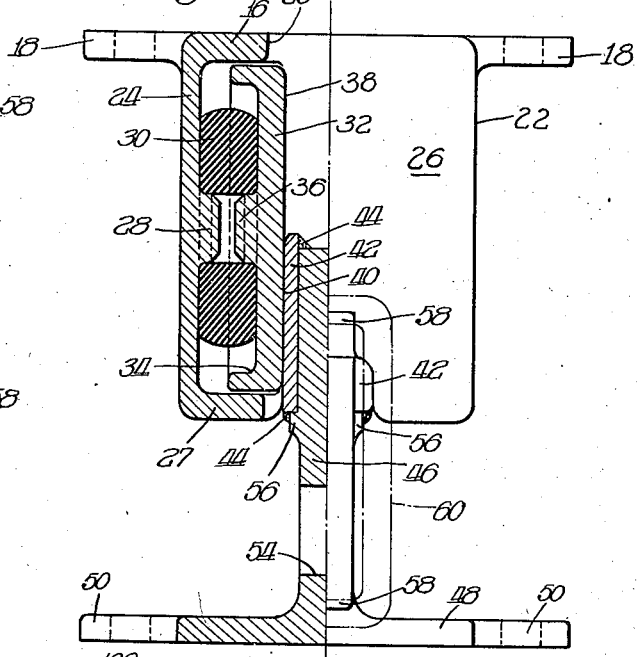
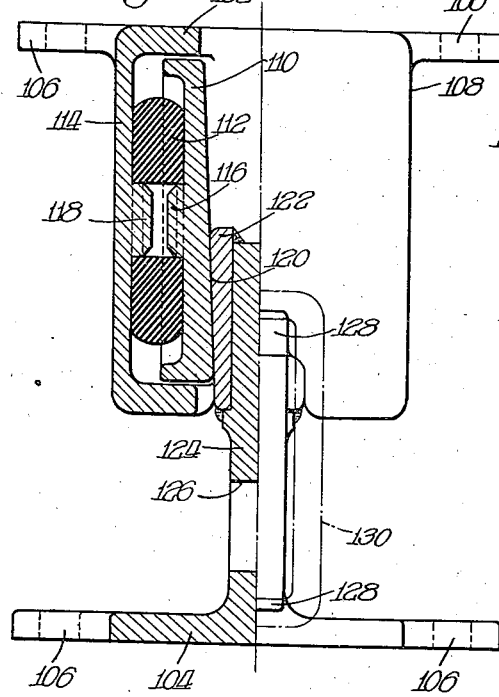
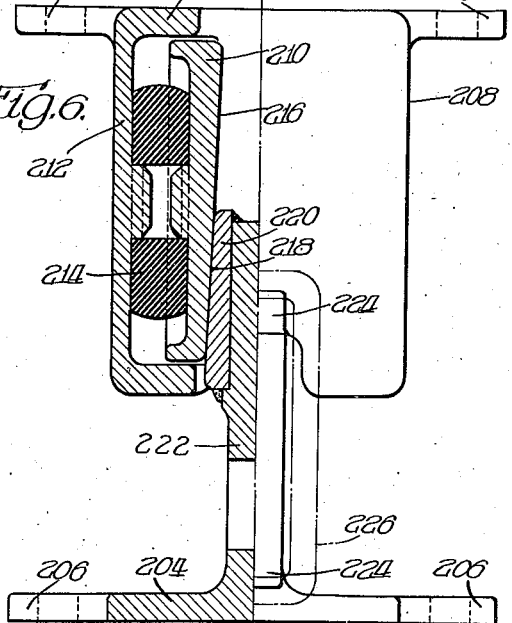
INVENTOR.
John E. Flesch
BY
Atty.

Patented Sept. 15, 1942

2,295,556

UNITED STATES PATENT OFFICE 2,295,556

SPRING GROUP

John E. Flesch, Chicago, Ill., assignor to American Steel Foundries, Chicago, Ill., a corporation of New Jersey Application March 15, 1941, Serial No. 383,537

13 Claims. (Cl. 267—9)

My invention relates to a spring group for a railway car truck and especially a group of coil springs in conjunction with which a friction absorbing device offers some degree of control of the natural vibration of such springs.

An object of my invention is to devise a spring group of relatively simple form in which a friction absorbing device may conveniently be associated with the coils and wherein the top and bottom spring plates may be utilized as support means for the followers of the friction device.

My novel structure contemplates an arrangement where coil springs may be supported on opposite sides of my novel friction absorbing device, said device and said springs being supported by the top and bottom spring plates and with the opposite followers of the friction absorbing device secured against relative movement with respect to the top and bottom spring plates. My novel arrangement is readily adapted to afford a substantially constant amount of frictional absorption and may easily be adapted to afford an increasing amount of frictional absorption on either the upstroke or downstroke as may be desired, thus adapting it for ready use in a great variety of installations.

My novel arrangement contemplates such a structure as that described wherein the wearing parts of the friction absorbing unit may readily be replaced, as frequently desired, or as often as may be required under service conditions without destruction of other parts of the friction unit.

Another object of my invention is to devise a spring group such as that described with a friction absorbing unit which will operate with equal facility with either follower uppermost, and either portion will readily free itself of surplus water or other extraneous material.

My novel spring group structure utilizes top and bottom spring plates with which may be integrally formed upper and lower followers of a friction absorbing device so that as the spring group is compressed and expanded, the action of the friction absorbing device coincides therewith and any sluggish action on the part of the friction device is prevented. An advantage of such an arrangement also arises from the fact that by rigidly fixing the followers to the spring plates or forming them integral therewith the friction absorbing device serves to stabilize the spring group and control any relative twisting or rotative action between the top and bottom spring plates, thus tending to stabilize the square relationship of the supporting and supported members between which the device may be inserted as, for example, between a bolster and a side frame of a railway car truck.

In the drawings,

Figure 1 is a top plan view of a spring group embodying my invention.

Figure 2 is a side elevation of the spring group shown in Figure 1.

Figure 3 is a top plan of the friction absorbing device utilized in the spring group shown in Figures 1 and 2. Figure 3A is a fragmentary side elevation thereof; and Figure 4 is an end elevation thereof, half in section, the section being taken approximately in the transverse vertical plane indicated by the line 4—4 of Figure 3.

Figure 5 is an alternate sectional view corresponding in general to that shown in Figure 4 but showing a tapered arrangement of the friction surfaces.

Figure 6 is a further sectional view similar to that of Figure 5, but showing the friction surfaces tapered in the reverse direction.

Describing the structure in detail, my novel spring group includes a top spring plate 2, and a bottom spring plate 4, said top spring plate having at the outboard end the downturned flange 6 of scallop-like form affording positioning means for the adjacent coil springs diagrammatically indicated at 8, 8. At the inboard end the top plate 2 is cut away as at 10 to accommodate the tapering portion of the bolster which it is designed to support. For other types of supported load carrying members the inboard end of the top spring plate may be similar to the outboard end as is the case with the bottom spring plate 4 which has the upturned flanges 12, 12 at each end serving as positioning means for the beforementioned coil springs 8, 8. Intermediate the coil springs, at opposite ends of the group, is supported my novel form of friction absorbing device generally designated 14. The top spring plate 2 may be afforded spaced openings 15, 15 facilitating inspection of the friction device 14 after assembly.

The friction absorbing device 14 is shown in detail in Figures 3 and 4 and comprises the top follower 16 with securing lugs 18, 18 at opposite sides thereof, the arcuate edges of which may conveniently afford additional positioning means for the before-mentioned coil springs. Each securing lug 18 is perforated and may be riveted to the top spring plate as seen at 20, 20 (Figure 1). Integrally formed with the top follower 16 is the downwardly projecting housing 22 of generally rectangular form including the parallel side walls 24, 24 and the end walls 26, 26, and an inturned flange 27 at the bottom edge of each side wall. The top of the housing is formed with a longitudinal slot 29 extending the length thereof, thus facilitating inspection of the device after assembly. Each of the side walls 24 has a plurality of spaced raised lugs or studs 28, 28 affording positioning means for the adjacent side of the compression spring or rubber pad 30, and the opposite side of each rubber pad 30 seats against the adjacent face of the friction shoe 32, said friction shoe being recessed as at 34 and afforded central positioning means 36 for said rubber spring. Each shoe 32 is of generally rectangular form, recessed on one side as already indicated, to partially house the enclosed rubber pad, and the opposite face of each shoe being formed as a flat rectangular friction surface, designated 38, which may have sliding frictional engagement as at 40 with the friction plate 42. The friction plate 42 may be skip welded as at 44, 44 to the main stem or friction panel 46 which is formed as an integral part of the bottom follower 48, said bottom follower having the general form of an inverted T-section with the upright friction panel 46 forming the leg of said T. The bottom follower 48, like the top follower, is formed with side ears or lugs 50, 50 which may be riveted as at 52, 52 to the bottom spring plate 4. The friction panel or center stem 46 may be cored away at spaced points as at 54 (Figure 3A) to lighten somewhat the structure of the bottom follower. Said friction panel 46 is of generally rectangular form, and on opposite sides thereof at an intermediate point may be formed with aligned longitudinal shoulders 56, 56 each affording abutment for the bottom edge of the adjacent wear plate 42 which may be welded thereto as already indicated. When the device is in its expanded form, substantially the lower half of each friction shoe 32 will thus bear against the adjacent wear plate 42 and have frictional engagement therewith, the two friction shoes at each side of the device thus having bearing with substantially the full area of the adjacent wear plate. As the device is compressed, the area of frictional engagement will not vary substantially and thus the frictional absorption will remain substantially constant.

At each end of each follower may be formed a lug 58 (Figure 3A) and over said lugs at each end of the device may be secured a shipping link 60, the device being compressed in order to place said link 60 over said lugs 58, 58, said links being removed after the device is placed in operation, and serving the sole purpose of maintaining the friction device in assembly during shipment.

When the wear plates and friction shoes have sustained a predetermined amount of wear, the device may be dismantled and new shoes and wear plates applied. This work may readily be done without dismounting the followers from the associated spring plates. In the modification shown in Figure 5, the top follower 102 and the bottom follower 104 are substantially identical with the top and bottom followers of the device illustrated in Figure 4, each of said followers having on opposite sides thereof securing lugs 106, 106 and said top follower having the housing or shoe carrier 108 in each side of which may be supported a plurality of friction shoes 110, 110 with the associated rubber blocks 112, 112 partially housed therein and confined between said shoes and the adjacent side wall 114 of the housing, said shoes and said side wall being afforded positioning means 116 and 118 respectively for said rubber spring. In this modification the shoes 110 are formed with a tapering friction surface having complementary engagement as at 120 with the friction plate 122 which is mounted on the friction panel or center stem 124 of the bottom follower 104 in like manner to that of the previous modification, said center stem 104 also being cored away as at 126 to reduce weight. Figure 5 also shows the top and bottom followers with end lugs 128, 128 serving as means for mounting the shipping link 130. In this modification the frictional engagement at 120 is so arranged that the amount thereof decreases as the device is compressed and increases on the upstroke or release.

In the modification shown in Figure 6, the friction surfaces are arranged in the reverse of that described for Figure 5 so that the amount of frictional absorption increases on the downstroke and is reduced on the upstroke. In the modification of Figure 6 now under consideration, the top follower 202 and bottom follower 204 are identical with the modifications previously described, having the securing lugs 206, 206 at opposite sides thereof, said top follower having the integral housing 208 affording a carrier at each side thereof for a plurality of friction shoes 210, 210, and between each friction shoe 210 and the adjacent side wall 212 of the housing may be positioned in compression a rubber spring 214. The friction surface 216 at the back of each friction shoe is tapered so that the bottom wall portion of each shoe is relatively thin as compared with the top wall portion thereof, and said friction surface 216 may have friction engagement as at 218 with the wear plate 220 whose wear surface is supported at an angle complementary to that of the friction shoe, said wear plate 220 being secured on the center stem or friction panel 222 of the bottom follower 204 in manner as previously described. In this modification, each follower is formed with end lugs 224, 224 serving as mounting means for the shipping link 226. In the modification shown in Figure 6, the amount of frictional absorption is gradually increased on the downstroke to a maximum at the bottom of the stroke, and gradually decreased on the upstroke to a minimum in the fully released position.

It will thus be seen that in a relatively simple arrangement I have provided a spring group with a friction device which may conveniently be modified or adapted to substantially all of the varying requirements which may be made under different loading conditions of varying types of railway cars. The degree of angularity of the complementary friction surfaces on the shoes and wear plates, as illustrated in Figures 5 and 6, may be modified to suit the particular conditions contemplated and where equal friction absorption is desired on the up and the downstroke, the modification illustrated in Figure 4 may be used. The device is easily assembled or dismantled, and after a follower is secured to its associated spring plate it need never be detached therefrom when it is desired to replace shoes or wear plates.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a spring group, spaced plates, a coil spring supported between said plates at each end of said group, and a friction absorbing device interposed between said coil springs with followers secured respectively to said plates, one of said followers having an integral friction panel supporting friction surfaces and the other of said followers having integral means supporting friction shoes in engagement with each of said surfaces, resilient pads interposed between said shoes respectively and said supporting means, and aligned positioning means on said shoes and said support means for said pads.

2. In a spring group, top and bottom plates, spaced coil springs, and an intervening friction device supported between said plates with opposite followers of said device secured to said plates respectively, one of said followers having an integral friction panel with horizontal ledges on opposite sides thereof, wedge shaped wear plates supported against said ledges, and the other of said followers having an integral shoe carrier supporting a plurality of friction shoes in engagement with each of said wear plates, and spaced resilient members between respective shoes and the support means therefor.

3. In a spring group, top and bottom spring plates, a coil spring, and a friction device supported therebetween with the followers of said device secured respectively to said plates, one of said followers having an inwardly projecting friction panel with aligned ledges on opposite sides thereof and friction wear plates supported against said ledges, the other of said followers having an inwardly projecting housing supporting friction shoes in engagement with said wear plates at opposite sides of said panel, and a resilient member urging each of said shoes into engagement with the adjacent friction plate.

4. In a spring group, top and bottom spring plates, a coil spring at each end of said group, a friction absorbing device interposed between said coils with respective followers secured to said plates, one of said followers having an integral housing forming a shoe carrier, a friction shoe mounted in said carrier at each side of said device, a resilient member between each shoe and the adjacent portion of said carrier, and the other of said followers having an integral friction panel supporting friction surfaces for engagement with the shoes at opposite sides of said device and aligned positioning means on each of said shoes and said first-mentioned follower securing therebetween the associated resilient member.

5. In a spring group, top and bottom spring plates, a coil spring at each end of said group, a friction absorbing device interposed between said coils with respective followers secured to said plates, one of said followers having an integral housing forming a shoe carrier, a friction shoe mounted in said carrier at each side of said device, resilient means between each shoe and the adjacent portion of said carrier, and the other of said followers having an integral friction panel supporting friction surfaces for engagement with the shoes at opposite sides of said device, and aligned positioning means on each of said shoes and said carrier for said resilient means.

6. In a spring group, spaced spring plates, a plurality of coil springs between said plates at each end of the group, and an intervening friction absorbing device comprising followers secured respectively to said plates, one of said followers having an integral friction panel with wear plates mounted on opposite sides thereof and the other of said followers having integral shoe carrier means supporting a plurality of friction shoes in engagement with each of said wear plates, resilient means under compression between each of said shoes and said carrier means, and oppositely positioned securing means on said shoe and said carrier means for said resilient means.

7. In a spring group, spaced plates, a coil spring supported between said plates at each end of said group, and a friction absorbing device interposed between said coil springs with followers secured respectively to said plates, one of said followers having an integral friction panel supporting friction surfaces and the other of said followers having integral means supporting friction shoes in engagement with each of said surfaces, and spaced resilient pads interposed between said shoes respectively and said supporting means.

8. In a spring group, top and bottom spring plates, a plurality of coil springs confined therebetween and a friction absorbing device comprising top and bottom followers secured to respective plates, said top follower housing therewithin a plurality of friction shoes, each of said shoes comprising a cup-like recess on one side thereof and a friction surface on the opposite side thereof, a resilient member partially received within said recess and under compression between said shoe and said top follower, and said bottom follower comprising friction surfaces in frictional engagement with said first-mentioned surfaces.

9. In a spring group, top and bottom plates, a plurality of coil springs confined therebetween, and a friction absorbing device comprising top and bottom followers secured to respective plates, said top follower supporting a plurality of friction shoes, each of said shoes comprising a cup-like recess on one side thereof with a lug centrally formed therein and a friction surface on the opposite side thereof, a lug on said top follower aligned with said first-mentioned lug, a resilient member partially received within said recess, under compression between said shoes and said top follower, and having an opening therethrough receiving therewithin said lugs, and said bottom follower comprising friction surfaces in frictional engagement with said first-mentioned surfaces.

10. In a spring group, top and bottom plates, a plurality of coil springs confined therebetween, and a friction absorbing device comprising a housing secured to said top plate, and a bottom follower secured to said bottom plate, said top follower receiving therewithin a plurality of friction shoes, spaced resilient pads between each side of said housing and the associated shoes, and said bottom follower comprising friction surfaces in frictional engagement with said shoes.

11. In a friction absorbing device, top and bottom followers, said top follower housing therewithin a plurality of friction shoes, each of said shoes comprising a recess on one side thereof, a lug positioned centrally of said recess, and a friction face on the opposite side thereof, a lug on said top follower positioned opposite said first-mentioned lug, and a resilient pad partially received within said recess and positioned at opposite sides thereof by said lugs, said bottom follower comprising friction surfaces in frictional engagement with said faces.

12. In a friction absorbing device, a housing receiving therewithin a plurality of friction shoes, spaced resilient pads between each side of said housing and the associated shoes, and a follower comprising friction surfaces in frictional engagement with said shoes.

13. In a friction absorbing device, a housing, a plurality of friction shoes received therewithin, spaced pads between each side of said housing and the associated shoes, aligned positioning means for said pads on said shoes and said housing, and a bottom follower comprising friction surfaces in frictional engagement with said shoes.

JOHN E. FLESCH.